(12) United States Patent
Vaninetti et al.

(10) Patent No.: US 11,130,575 B2
(45) Date of Patent: Sep. 28, 2021

(54) SLIM AIRCRAFT MONUMENT WITH DEPLOYABLE WORKSTATION

(71) Applicant: B/E Aerospace, Inc., Winston-Salem, NC (US)

(72) Inventors: Travis J. Vaninetti, Bothell, WA (US); Jefferey M. McKee, Duvall, WA (US); Justin C. Christenson, Everett, WA (US); Shawn A. Claflin, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 9 days.

(21) Appl. No.: 16/408,935

(22) Filed: May 10, 2019

(65) Prior Publication Data
US 2020/0354060 A1 Nov. 12, 2020

(51) Int. Cl.
*B64D 11/00* (2006.01)
*A47B 31/06* (2006.01)

(52) U.S. Cl.
CPC .......... *B64D 11/0007* (2013.01); *A47B 31/06* (2013.01); *B64D 2011/0046* (2013.01)

(58) Field of Classification Search
CPC ........ B64D 11/0007; B64D 2011/0046; A47B 31/06; A47B 43/00; A47B 43/02; A47B 43/003; A47B 43/006; A47B 43/04
See application file for complete search history.

(56) References Cited

U.S. PATENT DOCUMENTS

| | | | | |
|---|---|---|---|---|
| 2,244,887 A | * | 6/1941 | Manley | A47B 43/003 312/6 |
| 3,340,829 A | * | 9/1967 | Palmer | A47B 43/006 108/149 |
| 9,862,491 B2 | | 1/2018 | McKee et al. | |
| 10,232,942 B2 | | 3/2019 | McKee | |
| 2006/0096821 A1 | * | 5/2006 | McKaba | A47B 43/003 190/9 |
| 2013/0126672 A1 | * | 5/2013 | Weitzel | B64D 11/0691 244/118.6 |

(Continued)

FOREIGN PATENT DOCUMENTS

| | | |
|---|---|---|
| DE | 102016207607 A1 | 11/2017 |
| EP | 3552963 A1 | 10/2019 |
| WO | 2007096000 A1 | 8/2007 |

OTHER PUBLICATIONS

Extended Search Report for European Application No. 19212940.1 dated Jul. 10, 2020, 11 pages.

*Primary Examiner* — Matthew W Ing
(74) *Attorney, Agent, or Firm* — Suiter Swantz pc llo

(57) ABSTRACT

A slim aircraft monument includes a structure installable in an aircraft passenger cabin adjacent to a cabin space (e.g., in front of an otherwise unused exit door). The slim monument has an overall width of not more than four to six inches. The slim monument includes a side door with an external handle, the door deployable into the cabin space to reveal a group of nested interconnected panels within. The nested panels are similarly deployable into the cabin space to form a substantially horizontal work surface and, underneath the work surface, vertically stacked bays providing temporary storage for storage drawers and a cart space adjacent to the storage drawers, the cart space capable of accommodating a half-size galley cart.

8 Claims, 8 Drawing Sheets

(56) References Cited

U.S. PATENT DOCUMENTS

| | | | |
|---|---|---|---|
| 2014/0209741 A1* | 7/2014 | Boenning | B64D 11/04 |
| | | | 244/118.6 |
| 2014/0355282 A1* | 12/2014 | Cuddy | B64D 47/02 |
| | | | 362/471 |
| 2015/0284085 A1* | 10/2015 | McKee | B64D 11/02 |
| | | | 244/118.5 |
| 2016/0167784 A1* | 6/2016 | Schliwa | B64D 11/04 |
| | | | 244/118.6 |
| 2016/0355266 A1* | 12/2016 | Seibt | B64D 11/0698 |
| 2017/0021929 A1 | 1/2017 | McKee et al. | |
| 2017/0106983 A1* | 4/2017 | Castanos | B64D 11/0691 |
| 2017/0152043 A1* | 6/2017 | Schaefer | B64D 11/0023 |
| 2017/0283059 A1 | 10/2017 | McKee | |
| 2017/0320580 A1* | 11/2017 | Roth | B64D 11/0602 |
| 2019/0308728 A1* | 10/2019 | McKee | B64D 11/00 |

* cited by examiner

SLIM AIRCRAFT MONUMENT WITH DEPLOYABLE WORKSTATION

BACKGROUND

Conventional aircraft monuments are purpose-built and generally inflexible products. The catering capacities and work/storage spaces of such monuments are not adaptable to multiple and diverse needs of cabin crew with respect to passenger catering. However, free space (e.g., space not already dedicated to passenger seating or storage) is extremely limited, especially in economy-class cabins, leaving few options to provide cabin crew with additional workspace. Similarly, from a passenger perspective, luxury-class aircraft provide entertainment and socialization spaces for their passengers. However, these amenities are rare in economy-class cabins for substantially the same reasons. Both single-aisle and larger twin-aisle aircraft may necessarily require free space immediately adjacent to their exit doors in order to facilitate safe, rapid evacuation of the aircraft under emergency conditions. However, under normal cruising conditions these spaces are left underutilized or unutilized.

SUMMARY

A slim aircraft monument is disclosed. In embodiments, the monument is installable in an aircraft passenger cabin adjacent to a cabin space (e.g., in front of an otherwise unused exit door). The slim monument has an overall width of no more than four inches. The slim monument includes a side door with an external handle, the door deployable into the cabin space to reveal a group of nested interconnected panels within. The nested panels are similarly deployable into the cabin space to form a substantially horizontal work surface and, underneath the work surface, vertically stacked bays providing temporary storage for storage drawers and a cart space adjacent to the storage drawers, the cart space capable of accommodating a galley cart.

A slim aircraft monument incorporating storage compartments is also disclosed. In embodiments, the monument is installable between an aircraft ceiling and floor, adjacent to a cabin space (e.g., proximate to an exit door). The monument has an upper portion adjacent the ceiling, a lower portion adjacent the floor, and a middle portion between the upper and lower portions. The monument includes storage compartments accessible from the front side of the monument (e.g., the side facing into a longitudinal aisle of the aircraft) and a door on an adjacent side. The door is deployable via a handle, opening into the cabin space. Behind the door is a group of interconnected nested panels deployable from their folded, stowed state into the cabin space adjacent to the opening door. When deployed, the nested panels form a horizontal worksurface and, below the worksurface: 1) vertically stacked bays capable of accommodating storage drawers for temporary storage, and 2) a cart space below the worksurface and adjacent to the stacked bays, the cart space capable of accommodating a galley cart or trolley.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
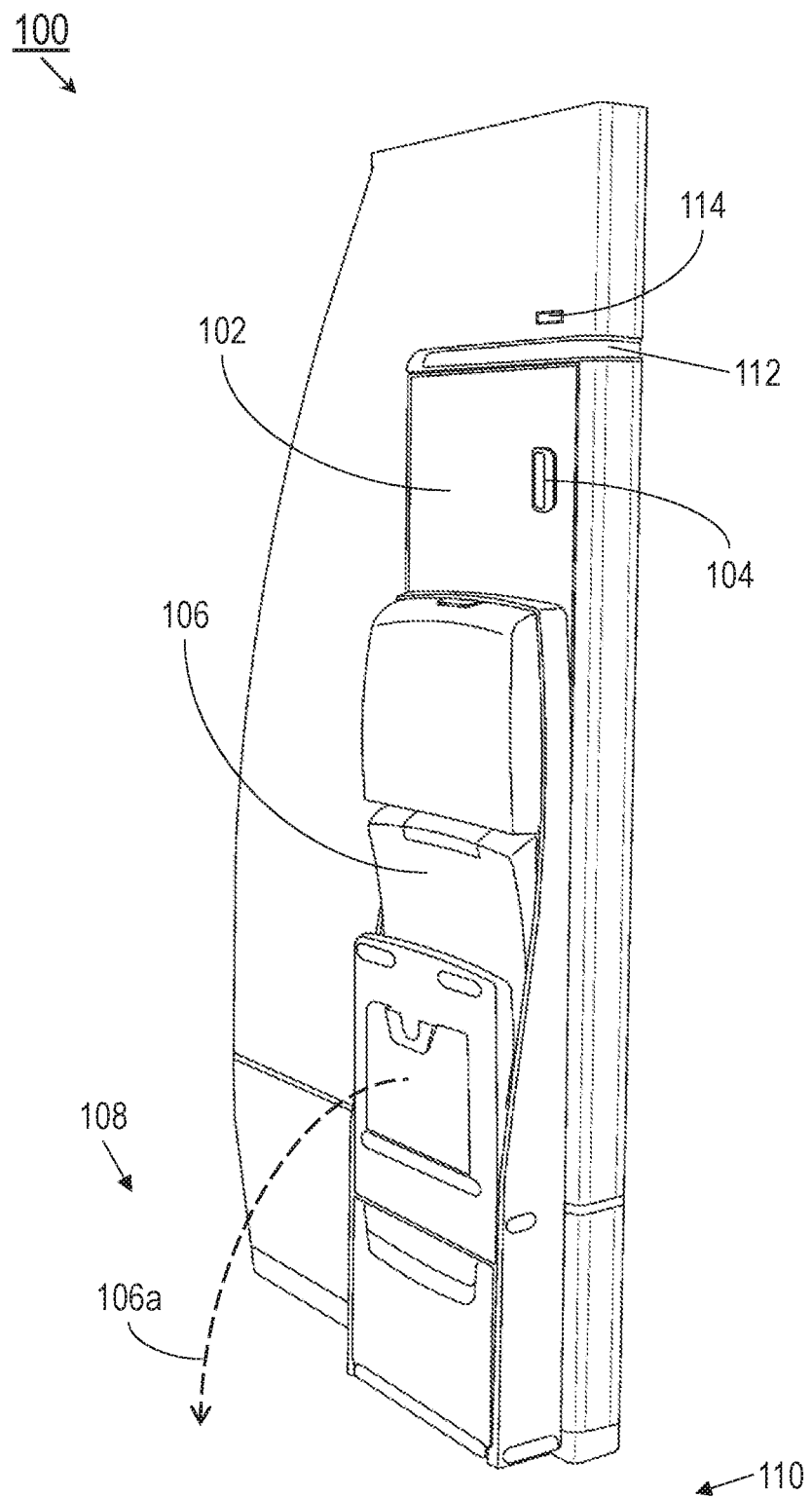
FIG. 1 is an isometric view of a slim aircraft monument in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to monuments configured to occupy minimal space within the passenger cabin while providing deployable workspaces and serving spaces for cabin crewmembers. The monuments may deploy into the otherwise unused cabin spaces adjacent to exit doors for in-seat catering or for self-service use by passengers circulating around the cabin at cruising altitude. As the monuments are of minimal size and deploy into otherwise unused doorways and spaces, passenger capacity is not adversely affected.

Referring to FIG. 1, a slim monument 100 is disclosed. In embodiments, the slim monument 100 may include an external door 102 having a door handle 104. In some embodiments, the slim monument 100 may include a deployable cabin attendant seat 106 (CAS) mounted to the external door 102.

The slim monument 100 may be installed within a passenger cabin of an aircraft as a class divider between sections or proximate to an exit door, deploying into the otherwise unused cabin space 108 (e.g., a lateral aisle partially or fully extending laterally across the passenger cabin, substantially parallel to the aircraft wingspan) directly in front of the exit door (e.g., at cruising altitudes when passengers are generally permitted to leave their seats). For example, the slim monument 100 may extend from an interior sidewall of the aircraft toward a longitudinal aisle 110 of the aircraft. However, the width of the slim monument 100 (e.g., in an undeployed state) relative to the longitudinal aisle 110 may be no more than 6 inches (~15 cm) at its widest point, and may preferably be approximately 3-4 inches (~7.6-10 cm) at its widest. If the slim monument 100 includes the CAS 106, the total width of the slim monument and the CAS combined may be approximately 8-9 inches (~20.3-22.9 cm) at its widest. In some embodiments, the slim monument 100 may be positioned such that its width, e.g., its smallest dimension when in an undeployed state, is parallel to a lateral aisle of the aircraft (e.g., and orthogonal to the longitudinal aisle 110).

When the slim monument 100 is in an undeployed state, the CAS 106 may fold downward (106a) into the cabin space 108 for temporary occupancy by a cabin crewmember, e.g., during taxi, takeoff and landing (TTL) flight segments, when the CAS may provide a seated position with an advantageous view of the adjacent passenger cabin and its occupants. In embodiments, the slim monument 100 may include light bands 112 on one or more exterior surfaces. The light bands 112 may be connected to, and powered by, aircraft power systems and may be networked for remote control (e.g., activation, deactivation, increases/decreases in lighting intensity) in conjunction with section-wide or cabin-wide ambient lighting schemes.

The external door 102 may be deployable via the handle 104, the handle serving as a grab point for manual one-handed deployment of the door by a cabin crewmember. In some embodiments, the external door 102 may be held in place by a release system (e.g., magnetic or mechanical latching/locking systems) connected to a radio frequency identification (RFID) reader 116 (e.g., RFID scanner). For example, the external door 102 may be configured for deployment only by authorized cabin crewmembers in possession of the proper RFID tag. When the RFID reader 116 scans the appropriate RFID tag, the release system may fully or partially deploy the external door 102 (e.g., releasing the door so that the cabin crewmember may complete the deployment).

Figure 2:
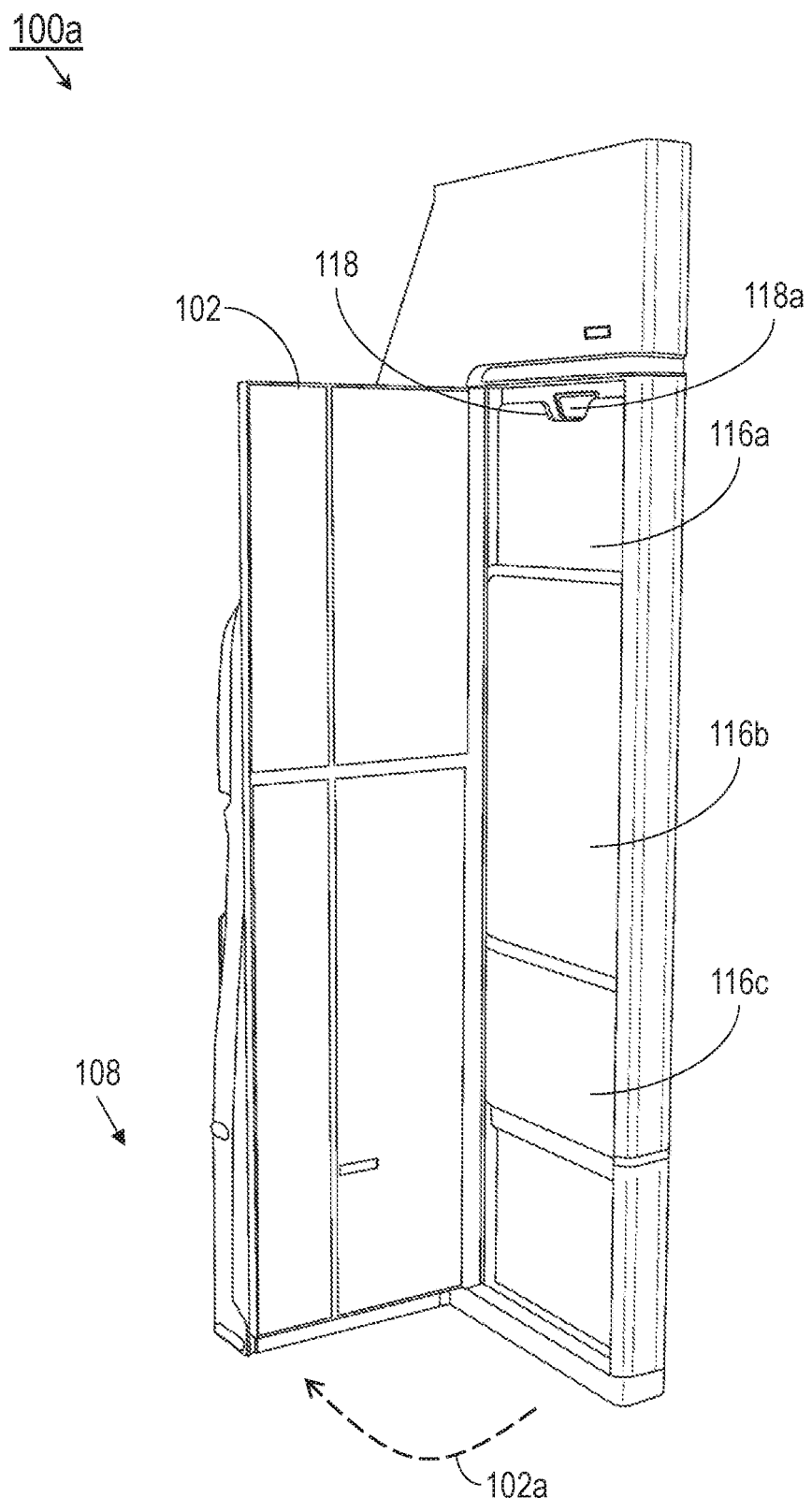
FIG. 2 is an isometric view of the slim aircraft monument of FIG. 1 in a partially deployed state.

Referring to FIG. 2, a slim monument 100a is disclosed. The slim monument 100a may be implemented and may function similarly to the slim monument 100 of FIG. 1, except that the slim monument 100a may be transitioned (e.g., by a cabin crewmember or other user) from the undeployed state shown by FIG. 1 to a deployed state in two steps. First, the door 102 may be opened (102a) into the cabin space 108 (e.g., via the handle 104, FIG. 1). For example, the cabin space 108 may be proximate to an exit door of the aircraft, and the opening 102a of the door 102 may partially or fully block the exit door from unauthorized access (e.g., while the aircraft is at cruising altitude).

In some embodiments, the opening 102a of the door 102 may reveal a group of interconnected nested panels 116a-c and 116d (not shown) folded into the slim monument 100a. The topmost nested panel 116a may include an indent 118 capable of serving (e.g., in conjunction with a recess 118a set into the interior surface of the slim monument 100a) as a grasp point for deployment of the nested panels 116a-d.

In some embodiments, the slim monument 100a may incorporate any appropriate combination of physical, mechanical, or magnetic means to hold the external door 102 in its deployed position (e.g., orthogonal to the stowed orientation of the door and to the slim monument 100a) once the door is fully opened.

Figure 3A:
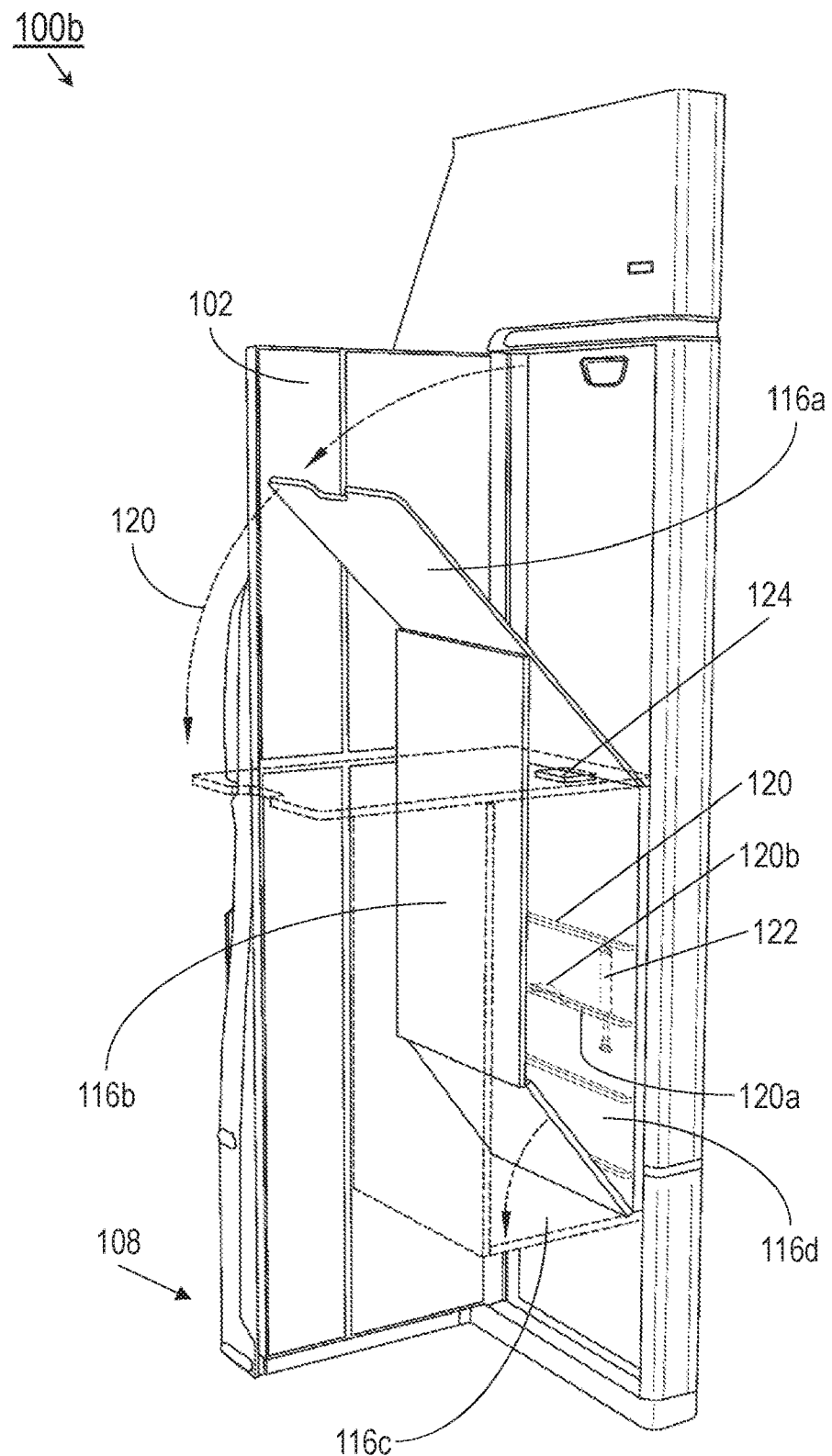
FIG. 3A is an isometric view of the slim aircraft monument of FIG. 1 in a partially deployed state.
Figure 3B:
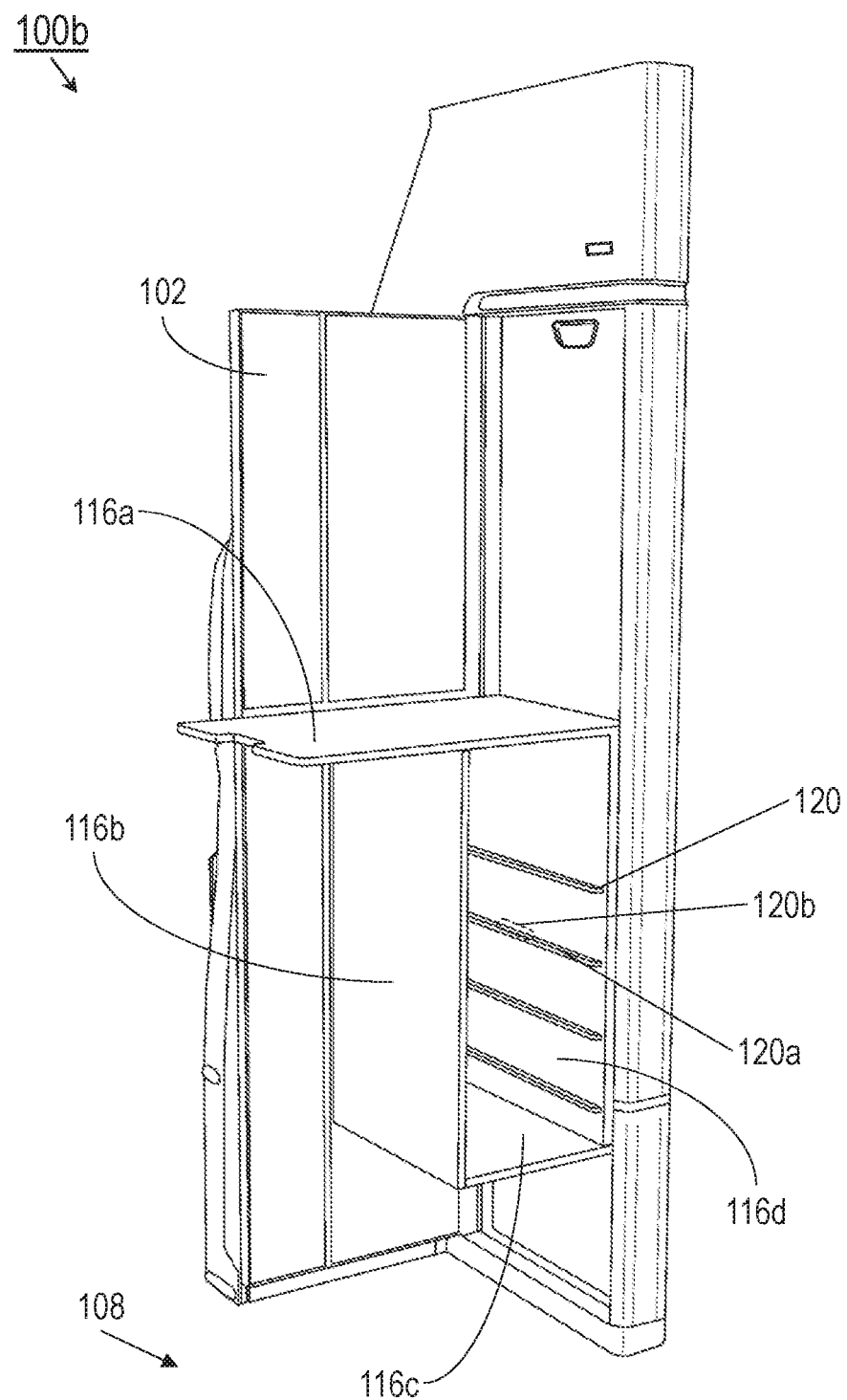
FIG. 3B is an isometric view of the slim aircraft monument of FIG. 1 in a fully deployed state.

Referring to FIGS. 3A and 3B, a slim monument 100b is disclosed. The slim monument 100b may be implemented and may function similarly to the slim monument 100a of FIG. 2, except that the slim monument 100b may be transitioned from the partially deployed state shown by FIG. 2 to a fully deployed state (shown by FIG. 3B) via the second of two steps (e.g., the first step being the deployment of the external door 102 shown by FIG. 2). For example, the nested panels 116a, 116c may be deployed downward (into the cabin space 108 between the door 102 and the slim monument 100b) into horizontal orientations, while the nested panels 116b, 116d remain substantially vertical but fold out and downward. The deployed nested panels 116a-d may collectively form a compartment including multiple rails 120 or slats set into the nested panel 116d (and into the opposing surface of the nested panel 116b) in a spaced apart relationship, each pair of rails capable of accommodating a storage drawer. In some embodiments, the rails 120 may be sized and/or spaced to accommodate other types of removable storage compartments, e.g., a galley standard unit.

In some embodiments, the rate of deployment of the nested panels 116a-d may be controlled by a piston 122 (or any appropriately similar regulator) mounted to the interior of the slim monument 100b behind the nested panel 116d.

In some embodiments, the slim monument 100b may incorporate magnets to secure the nested panels 116a-d in both their stowed and deployed states once the nested panels are in the said respective states. The nested panel 116a, which provides the horizontal worksurface in its deployed state, may be held in place by a block 124 mounted to the interior surface of the slim monument 100b.

In some embodiments, the rails 120 may include a spring-mounted rail 120a set into the nested panel 116d and substantially aligned with the hinged intersection of the nested panels 116b-c. For example, the spring-mounted rail 120a may incorporate a leaf spring 120b to reduce the width of the nested panels 116a-d in their stowed position (as shown by FIG. 2), preventing the nested panels from binding or rotating in the opposite direction (e.g., via the coplanar hinged connections between the nested panels) during deployment or stowage and allowing the nested panels to re-stow as compactly as possible.

In some embodiments, the nested panels 116a-d and their associated hardware may be retrofitted into or onto an existing monument or structure adjacent to an exit door or other appropriate cabin space 108.

Figure 4:
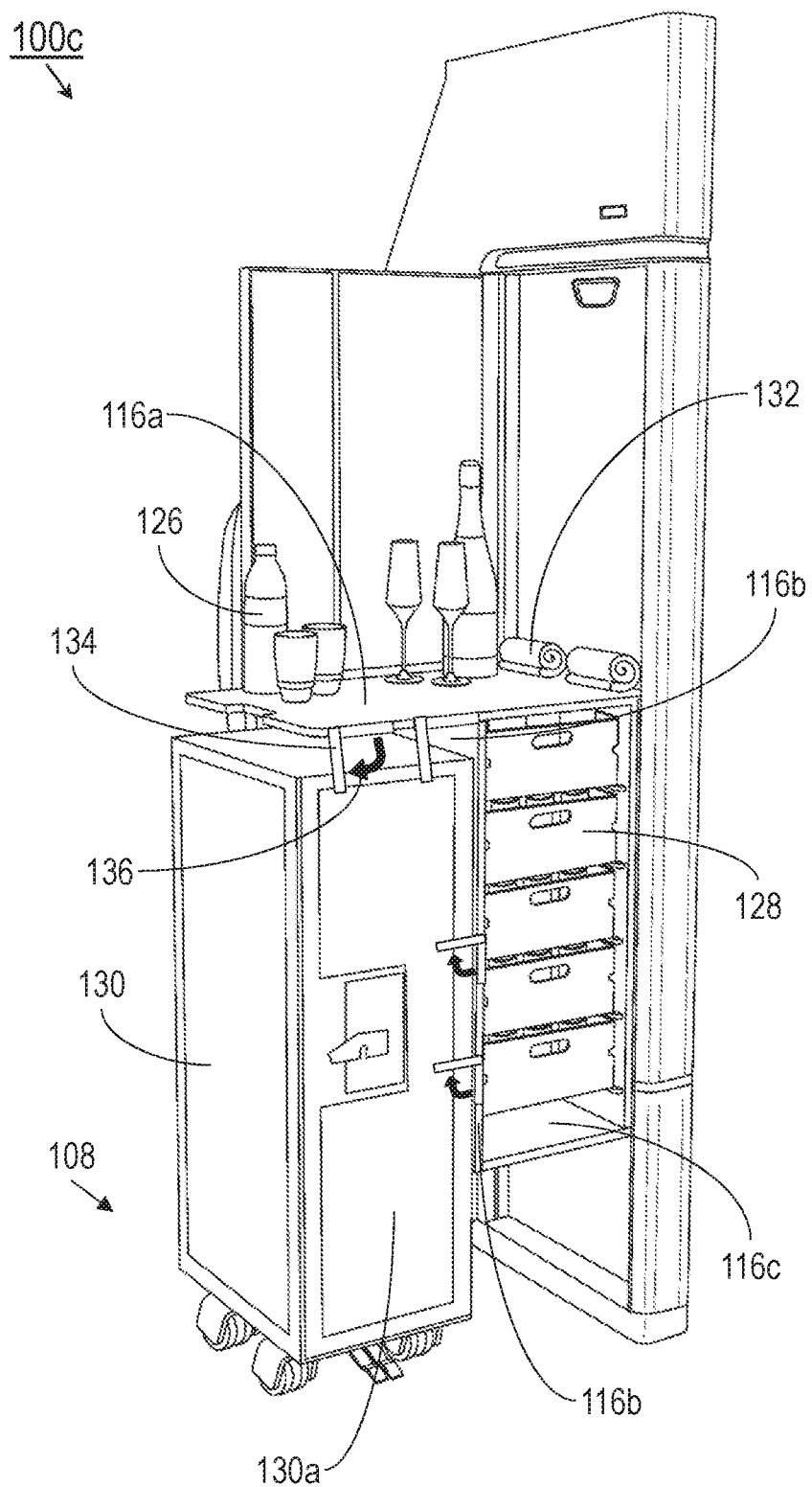
FIG. 4 is an isometric view of the slim aircraft monument of FIG. 1 in a fully deployed state.

Referring to FIG. 4, a slim monument 100c is disclosed. The slim monument 100c may be implemented and may function similarly to the slim monument 100b of FIGS. 3A and 3B, except that the slim monument 100c, in a fully deployed state, may accommodate refreshments 126, storage drawers 128, and a half-size galley cart 130 (e.g., trolley; generally measuring approximately 40 cm (~15.75 in) deep as opposed to an 80 cm deep full-size trolley).

In some embodiments, the orientation of the galley cart 130 may be orthogonal to that shown by FIG. 4, in that the galley cart 130 may be either a half-size or full-size galley cart positioned so that the forward door 130a of the galley cart opens into the cabin space 108.

For example, the nested panel 116a may deploy into a horizontal worksurface capable of supporting refreshments 126 for in-seat catering or food service (e.g., when the slim monument 100c is deployed at a cabin location remotely situated from the aircraft galley). In embodiments, the refreshments 126 and storage drawers 128 (within which the refreshments may be stored in addition to napkins 132, utensils, and other amenities) may be transported from the galley to the slim monument 100c within the galley cart 130. The storage drawers 128 may be vertically stacked or otherwise temporarily stowed within the rails 120 (FIG. 3B) of the compartment formed by the nested panels 116b-d. The galley cart 128 may be temporarily stowed within the space under the worksurface of the nested panel 116a and adjacent to the storage drawers 128. When in-seat services are concluded, the storage drawers 128 and their contents (e.g., refreshments 126 and napkins 132) may be transported back to the main galley via the galley cart 130 (which itself may be stowed within the galley).

In some embodiments, the nested panels 116a-b may incorporate panel locks 134, e.g., portions of the nested panels capable of 90-degree rotation (136) into a deployed position. When in the deployed position, the panel locks 134 may help secure the galley cart 130 in place under the nested panel 116a, preventing the galley cart 130 from shifting excessively inflight (e.g., during turbulent conditions).

Figure 5:
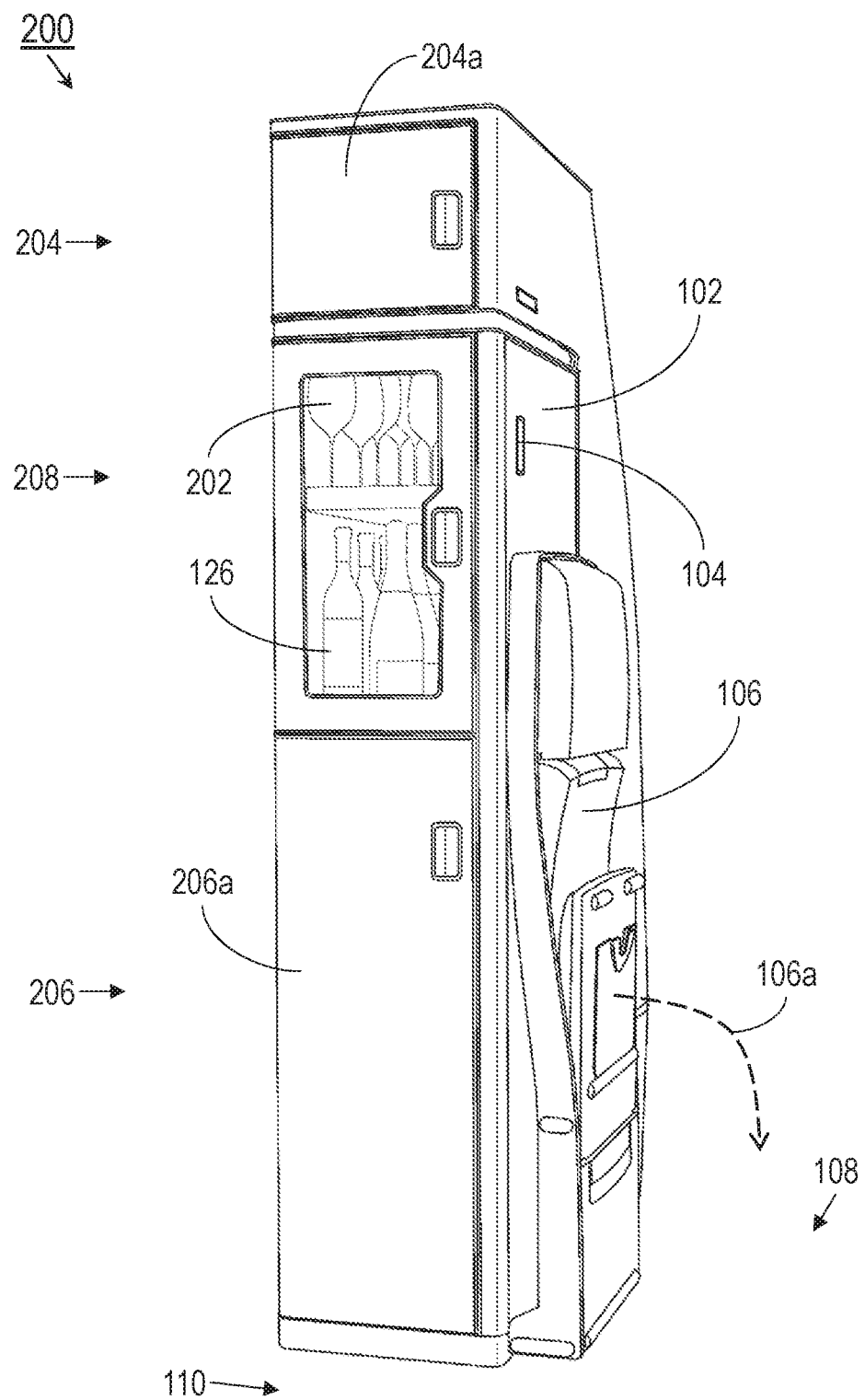
FIG. 5 is an isometric view of a slim aircraft monument in accordance with example embodiments of this disclosure.

Referring to FIG. 5, a slim monument 200 is disclosed. The slim monument 200 may be implemented and may function similarly to the slim monument 100, 100a-c of FIGS. 1-4, except that the slim monument 200 may incorporate storage compartments for refreshments 126, glassware 202, storage drawers (128, FIG. 4), emergency equipment, or other equipment and amenities.

In embodiments, the slim monument 200 may include an upper portion 204 adjacent to the ceiling of the aircraft passenger cabin, a lower portion 206 adjacent to the floor of the passenger cabin, and a middle portion 208 between the upper and lower portions. The upper portion 204 and lower portion 206 may incorporate storage compartments accessible from the longitudinal aisle 110 (e.g., via doors 204a, 206a). The CAS 106 mounted on the door 102 may be deployed (106a) into the cabin space 108 for use while the slim monument 200 is in an undeployed state.

Figure 6:
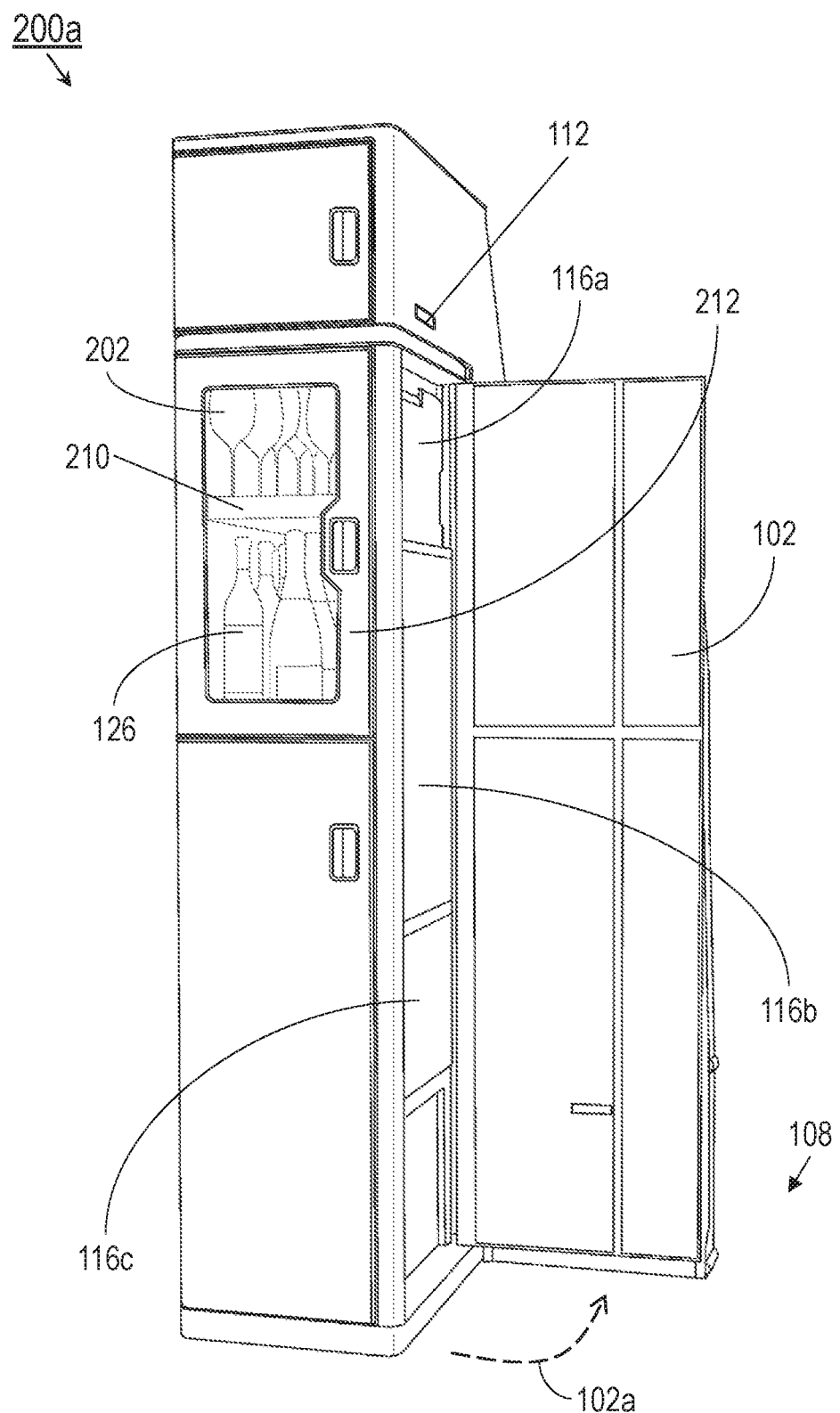
FIG. 6 is an isometric view of the slim aircraft monument of FIG. 5 in a partially deployed state.

Referring to FIG. 6, a slim monument 200a is shown. The slim monument 200a may be implemented and may function similarly to the slim monument 200 of FIG. 5, except that the slim monument 200a may be in a partially deployed state with the opening 102a of the door 102 (either manually via the handle 104 (FIG. 5), via the RFID reader 112, or via a combination of both) into the cabin space 108. The nested panels 116a-c and 116d (not shown) may be deployed or unfolded into the cabin space 108 to complete the deployment of the slim monument 200a.

In embodiments, the middle portion 208 of the slim monument 200a may incorporate a self-service compartment 210 for use by passengers moving about the cabin (e.g., once the aircraft has achieved safe cruising altitude). The self-service compartment 210 may include a partially or fully transparent door 212 through which refreshments 126, glassware 202, and other contents of the compartment are clearly visible. Passengers may use the otherwise empty cabin space 108 for self-service or socialization inflight, while the door 102 may partially or fully obstruct unauthorized access to an exit door (e.g., if the cabin space 108 is adjacent to an exit door behind the deployed door).

Figure 7:
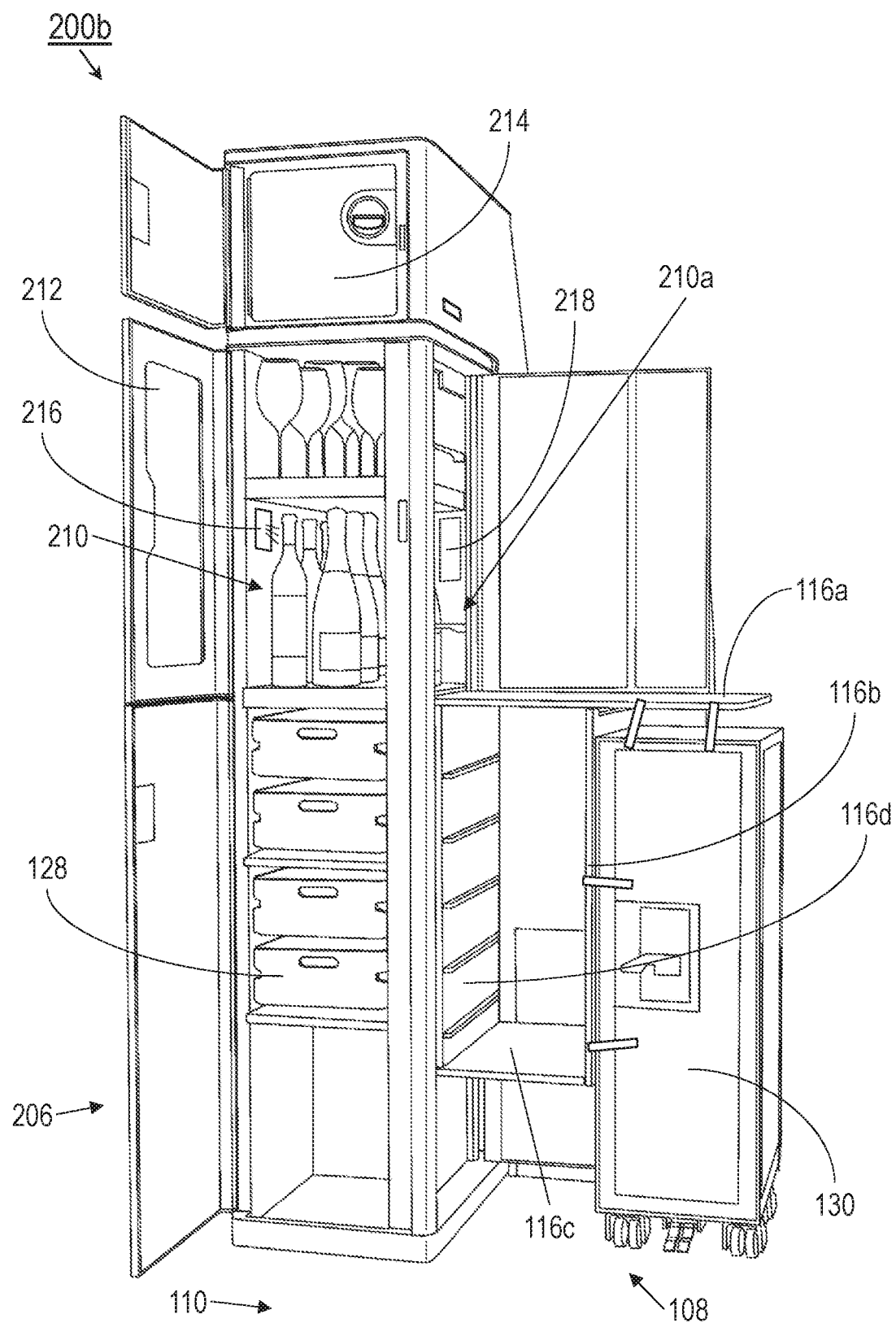
FIG. 7 is an isometric view of the slim aircraft monument of FIG. 5 in a fully deployed state.

Referring to FIG. 7, a slim monument 200b is shown. The slim monument 200b may be implemented and may function similarly to the slim monument 200a of FIG. 6, except that the slim monument 200b may be in a fully deployed state with the deployment of the nested panels 116a-d into the cabin space 108.

In embodiments, the storage drawers 126 may be stowed within the lower portion 206 of the slim monument 200b (as opposed to the galley cart 128) and deployed in the compartment formed by the nested panels 116b-c. The upper portion 204 of the slim monument 200b may be sized to accommodate a galley standard unit 214 for the stowage of additional refreshments, utensils, or equipment.

In embodiments, the self-service compartment 210 may be accessible to passengers and crew from multiple sides. For example, the transparent door 212 may be opened to grant access to the contents of the compartment from the longitudinal aisle 110. Similarly, once the nested panel 116a has deployed into a horizontal worksurface, passengers on an adjacent side of the self-service compartment 210 (e.g., proximate to the nested panel and the cabin space 108) may access the self-service compartment from that side as well (e.g., through the portal 210a).

In some embodiments, the self-service compartment 210 may incorporate interior lighting 216 for illuminating the contents of the compartment. Similarly, the self-service compartment 210 may incorporate an integrated chiller device 218 to maintain the contents of the compartment at a controlled temperature. In some embodiments, the portal 210a may be covered by a sidewall and the service compartment accessible solely through the transparent door 212. The interior lighting 216 and chiller device 218 may be connected to, and supplied with electrical operating power by, onboard power systems.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A aircraft monument, comprising:
 a structure installable in an aircraft cabin proximate to a cabin space, the structure having a smallest width of not more than six inches and comprising:
 a door configured to deploy from a closed position to an open position within the cabin space; and
 a plurality of nested panels deployable from a folded position substantially parallel to the door to a deployed position within the cabin space and adjacent to the door, the plurality of nested panels in the deployed position corresponding to:
  a substantially horizontal work surface;
  a plurality of bays below the work surface, each bay configured to accept a storage container; and
  a cart space below the worksurface and adjacent to the plurality of bays, the cart space capable of partially enclosing a galley cart.

2. The aircraft monument of claim 1, further comprising:
 at least one cabin attendant seat mounted to the door and deployable for use when the door is in the closed position.

3. The aircraft monument of claim 1, wherein:
 the cabin space is adjacent to at least one of a longitudinal aisle of the aircraft and a lateral aisle of the aircraft.

4. The aircraft monument of claim 1, wherein:
 the cabin space is adjacent to an exit door of the aircraft; and
 the door is configured to at least partially obstruct the exit door when in the open position.

5. The aircraft monument of claim 1, further comprising:
 at least one lighting band disposed on an exterior surface of the monument, the lighting band comprising one or more lighting elements configured to illuminate the cabin space.

6. The aircraft monument of claim 1, further comprising:
 a radio frequency identification (RFID) reading device disposed proximate to the door and configured to detect an RFID tag; and
 a release system communicatively coupled to the RFID reader and operatively coupled to the door, the release system configured to at least partially deploy the door from the closed position based on the detection of the RFID tag.

7. The aircraft monument of claim 1, further comprising:
 a plurality of panel locks attached to the plurality of nested panels and configured to restrain the movement of the galley cart when the plurality of panel locks is in a deployed state, each panel lock rotatable to the deployed state.

8. The aircraft monument of claim 1, wherein the plurality of nested panels includes:
 a pair of first panels having a substantially vertical orientation when in the folded position and a substantially horizontal orientation when in the deployed position; and
 a pair of second panels hingedly coupled to the pair of first panels and having a substantially vertical orientation when in the deployed position, the pair of second panels collectively forming the plurality of bays.

* * * * *